United States Patent Office 2,994,480
Patented Aug. 1, 1961

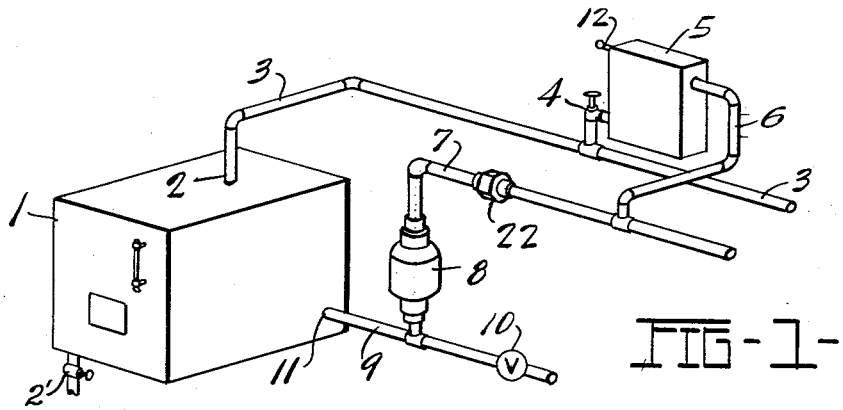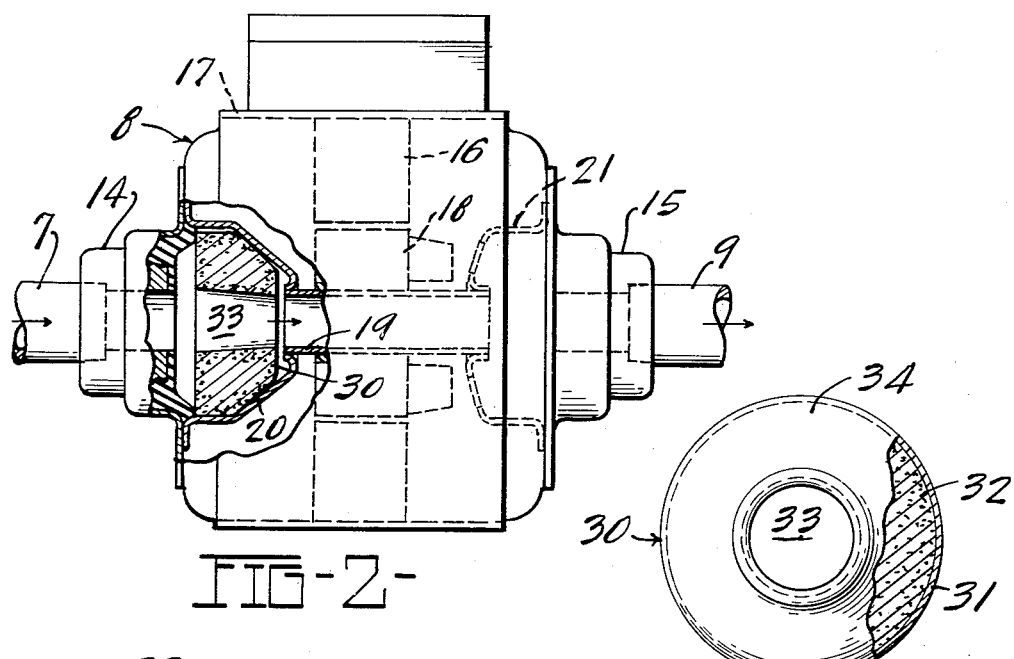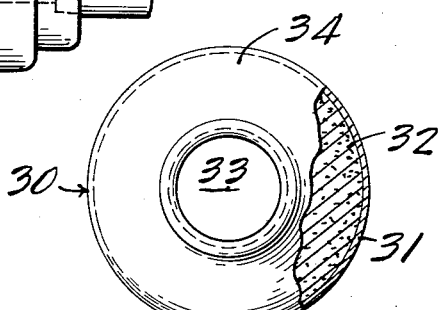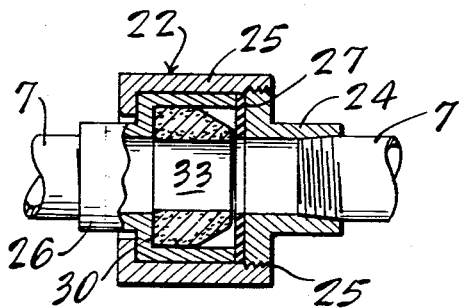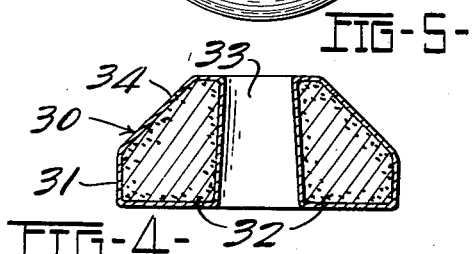

2,994,480
SLUDGE DISPERSING HEATED LIQUID
CIRCULATING SYSTEM
Richard H. Carter, Fostoria, Ohio, assignor to The
Fostoria Corporation, Fostoria, Ohio, a corporation of
Ohio
Filed Apr. 1, 1957, Ser. No. 649,831
11 Claims. (Cl. 237—63)

This invention relates to a method and means for preventing the coagulation of harmful sludges in heated liquid circulating systems. More particularly, it deals with a method of employing a sludge dispersing agent which will be achieved only by a heated liquid after the system is assembled and is in operation; such as for example, hot water in a home heating system in which such an agent is incorporated in the system and circulated by the hot water throughout the system to render any gums or sludges present therein harmless, and prevent clogging of its circulation equipment.

It is well known that during the installation of heated liquid circulating systems, a plurality of foreign materials are unavoidably introduced into said systems, such as for example pipe cutting oils, soldering pastes, pipe joint compounds, boiler seal materials, and the like. Since these systems are then generally sealed with an initial quantity of the liquid or water to be circulated therein, said foreign materials remain in said system and often form various types of gummy substances and sludges. These sludges may then circulate throughout said system and be deposited in various units or parts of the system, such as pump seals, pump bearings, valves and vents. These sludges not only cause malfunctioning of these parts but also may coat the inside of the heat exchange surfaces within the boiler and radiators in said system, thereby lowering the overall efficiency of the system.

Previously, it was proposed to introduce a suitable dispersant to said systems which would destroy the cohesive nature of such sludges therein and thereby render them harmless. However, the introduction of such a dispersant into said closed liquid circulating system presented several problems. Since it is common practice to pump cold water through such a system in order to remove the excess air trapped therein, to simultaneously bleed off gradually the consequent air-water mixture, and to replace it with a fresh water supply under pressure; the water in said system may be changed several times; thereby removing the sludge dispersant also if it had already been placed in the system before it was so purged. Hence, for the sludge dispersant to remain in the system, it should be introduced after the air purging process when the system is sealed, which is quite difficult to accomplish without again adding an undesirable amount of air to said sealed system.

Accordingly, it is an object of this invention to provide a simple, efficient, effective, economic, and convenient method of automatically introducing such a sludge dispersant into a heated liquid circulating system after said system has been put into operation.

Another object of this invention is to provide a sludge dispersant which may be placed in a circulating system when it is being assembled, or in one of the units thereof, and which will not be removed by normal purging of the air from the system before the liquid in the system is heated and the system is placed into operation.

Another object of this invention is to provide such a sludge dispersant which has corrosion inhibiting properties, sealing properties, and/or which can destroy the cohesive nature of any sludge present in such a liquid circulating system, thereby increasing the life and efficiency of said system.

Generally speaking, this invention relates to a heated liquid circulating system having a sludge dispersing agent incorporated in a recess therein before or during its assembly, which agent will not prevent the normal circulation of a liquid in the system after it is assembled, and which agent will not be dissolved or dispersed in said liquid until said liquid has been heated. Such a recess for this agent may normally occur in one of the units or parts of the system or it may be provided by a separate part therefor which may be incorporated in the system. Thus, this agent may be incorporated in that unit or part at the factory where that part is built, and thus the agent will not have to be added or be forgotten to be added by the person assembling the system. For example, pump manufacturers may be especially interested in incorporating such a dispersing agent in their circulating pumps for such systems, in that it is the moving parts and bearings of such pumps which are most affected by the normal accumulation of sludges and gums that occur in such circulating systems.

In order for such a dispersing agent to be effectively placed in the system during its assembly or in a part thereof before it is assembled, it is important that the dispersant agent is not lost, dissolved or exhausted when the system is purged or tested before it is actually put into operation. Thus, the particular dispersing agent of this invention is selected to have chemical and/or mechanical properties which make it ineffective in liquid solutions at normal room temperatures, but which will become effective, dissolved, melted and/or dispersed in the liquid in the circulating system after the liquid therein has been heated to the temperature at which it is normally to be used, such as for example in the case of a hot water circulating heating system, between about 110° and 160° F. One way of producing such properties for this agent, is to seal it in a parcel of or coat it with a liquid impervious material which does not dissolve or melt until the temperature of at least 110° F. is reached. Such coating or film materials for example, include: gelatin or paraffin, which may readily be coated on a cake, capsule or particles of the active dispersing agent before it is placed in the recess of the system. It is also possible to employ pre-molded or formed capsules, cakes, briquettes and the like of the dispersing agent with binders for these or similar materials which do not dissolve readily in unheated liquids at room temperature. Together with the sludge dispersing agent, there also may be mixed other agents such as anti-corrosive and/or building agents that may increase the effectiveness of the heated liquid circulating system. The shape of the cake or parcel may be made specifically for fitting into a given recess which may already occur in one of the units or parts of the system, such as for example an annulus or torus ring which may be located in the recess of a union between sections of pipes, or in the inlet or outlet of one of the parts or units, such as the circulating pump, boiler or radiator.

Although many different types of sludge dispersants, anti-corrosive agents and/or building agents and the like may be provided in the cake or parcel of the agent employed in this invention, some such agents which have been found effective in heated liquid circulating systems, and in particular, hot water heating systems for homes, include: organic detergents such as for example the sulfonates of long chain alcohols, polymerized hydrocarbons, non-ionic deteregnts, etc., building agents such as sodium ortho-, meta-, and sesquisilicates, sodium tripolyphosphates and other combined phosphates, carbonates, sodium hydroxide, sodium carboxymethylcellulose, neutral inorganic salts such as sodium sulfonate, etc. These agents may be either liquids or solids, provided they are coated or assembled into a parcel which may be installed into a unit of the system, which coating or parcel will not be decomposed or liberate the effectiveness of the dispersing agent therein until after the liquid in the system is heated, which occurs only after the system has been purged and is ready for operation.

Thus, an organic detergent and inorganic builder are mixed together and formed into pellets, briquettes, cakes, annuli, disks, or the like, and coated with gelatin or paraffin, which is insoluble in cold water but is readily dissolved or melted in hot water. One or more of said sludge dispersing pellets may be placed in any convenient location or recess therefor in a closed hot water heating system, such as the boiler, radiators, or pump. Cold water may then be pumped through said system to remove any air trapped therein, then this air-water mixture may be gradually bled off and replaced with fresh water under pressure. Heat is then applied to the boiler in said system so that said cakes or pellets located in said system will dissolve and be circulated throughout said system to render any sludge present therein harmless.

The above mentioned features and objects of this invention and the manner of attaining them will become more apparent and the invention itself will be best understood by reference to the following description of one example of a specific application and embodiment of the invention taken in conjunction with the accompanying drawing, wherein:

FIG. 1 is a schematic perspective view of a closed hot water heating system which may employ a sludge dispersant according to this invention;

FIG. 2 is a vertical view with parts broken away of the rotary pump shown in the system of FIG. 1 and having embodied therein an annular sludge dispersing cake located in a recess in the inlet of the pump;

FIG. 3 is a vertical cross section of a pipe-union type part having a recess for insertion of a sludge dispersing agent annular cake according to another embodiment of this invention;

FIG. 4 is an enlarged vertical cross section of a bevelled annularly shaped and coated sludge dispersing cake formed to fit in the recesses shown in the parts of FIGS. 2 or 3; and FIG. 5 is a plan view, with a part broken away, of the coated annular cake shown in FIG. 4.

Referring to FIG. 1, a hot water heating system is schematically shown which may comprise a boiler 1 having a hot water outlet 2 and a drain valve and outlet 2', ducts or pipes 3 to carry the hot water throughout said system, a valve assembly 4 which connects a radiator 5 to said hot water supply pipe 3, an outlet pipe 6 from said radiator 5 connected to the cold water return ducts or pipes 7, a circulating means or pump 8 in the return pipe 7 for circulating the water through the system, and a boiler inlet pipe 9 between the pump 8 and the inlet 11 of the boiler 1. The boiler inlet pipe 9 may have a branch having an automatic valve 10 for make-up water for the system, and for initially filling the system. There also may be provided an air bleeder valve 12 at the top of each radiator 5 to be opened when the system is being filled to purge it of air.

Although any type of pump may be employed as the circulator between pipes 7 and 9, the specific embodiment shown herein is a sealless electric induction motor driven rotary pump 8 (see for example Howard T. White copending application Serial No. 319,819, now U.S. Patent No. 2,753,806) shown in more detail in FIG. 2 which is axially connected and supported by the pipes 7 and 9 of the system of FIG. 1 through coupling and supporting members 14 and 15 (see for example Richard H. Carter copending application Serial No. 528,937, now U.S. Patent No. 2,786,802). This particular pump 8 comprises a stationary stator 16 in a housing 17 and a rotor and impeller unit 18 mounted on a fixed hollow fluid conducting shaft 19 supported at its outer ends by cup shaped supports 20 and 21. In this particular embodiment of the invention the sludge dispersing agent is shown formed into a bevelled annularly shaped cake 30 which is placed in the cup recess of the cup-shaped inlet shaft support 20, the opening 33 through said cake 30 allowing liquid or cold water to flow through said system to remove any air trapped therein.

Referring to FIG. 3, there is shown another part of such a system wherein the sludge dispersing cake 30 may be placed, namely: a union type joint 22 which may be placed in ducts 7 and may comprise an externally threaded portion 24 coacting with corresponding internally threaded ring portion 25 having a flange for urging the cup shaped portion 26 against a gasket 27 and said portion 24. When portion 24 is removed from said joint 22, a sludge dispersing cake 30 may be inserted in the recess of the cup shaped portion 26, which cake 30 has an opening 33 therein to allow the cold liquid to pass through said union 22 to permit the removal of any air trapped in the system.

FIGS. 4 and 5 show the sludge dispersing cake 30 with its opening 33 therethrough and its bevelled or tapered side 34 so that it may easily fit into the bevelled cup shaped inlet 20 of said pump 8. This cake 30 comprises a dispersant or active agent portion 32 which may comprise solid granules pressed or cemented together and a coating 31 thereover, which coating is insoluble or unaffected by cold liquid or water, but dissolves or melts in a liquid or water heated above about 110° F.

Although the specific example of the dispersant agent described above takes the form of a coated annulus located in a union and/or the inlet of a circulating pump, it is to be clearly understood that the agent may be placed at other parts in the system so long as it can be incorporated in that part during or before the assembly of the system. Furthermore, other types of pumps than that specifically disclosed herein may also be used without departing from the scope of this invention, as well as other types of recesses specifically provided in the system than that of the union shown in FIG. 3.

While there is described above the principles of this invention in connection with specific apparatus, it is to be clearly understood that this description is made only by way of example and not as a limitation to the scope of this invention.

What is claimed is:

1. A method of preparing a heated liquid circulating system and preventing the formation of undesirable foreign materials therein, comprising: forming a parcel of a dispersing agent containing liquid soluble substances, coating said parcel with an unheated-liquid impervious substance and fitting said parcel into a recess in a unit of said system, assembling said unit in said system, filling said system with liquid which is unheated, purging said system of foreign matter and then air while said liquid remains unheated, sealing said system, and then heating and circulating said liquid in said system whereby said coating is melted by said heated liquid and said agent is then automatically dispersed and dissolved and circulated in said heated liquid to prevent the coagulation of harmful materials in said system.

2. A method according to claim 1 wherein said liquid is water and said unheated-liquid impervious substance of said coating has a melting point in the temperature range between about 110° and 160° F.

3. In a heated liquid circulating system having: a circulating liquid, ducts for said liquid, means to heat said liquid, means to circulate said liquid through said system, a recess in a unit of said system, means for purging and flushing said system, and means for sealing said system, the improvement comprising: a parcel of a liquid dispersible dispersing agent located in said recess when said system is assembled, said parcel having a coating substantially impervious to and insoluble in said liquid as long as said liquid is unheated, whereby said system may be purged, checked, and tested with unheated liquid without destroying or removing said agent from said system and said agent may subsequently be automatically released in said system when the liquid is first heated to a sufficiently high temperature to effect the removal of said coating.

4. A system according to claim 3 wherein said recess, having said parcel therein, is concentric with the flow of said fluid through said system.

5. A system according to claim 3 wherein said coating has a melting point in the temperature range between about 110° F. and 160° F.

6. A system according to claim 3 wherein said coating comprises a gelatin.

7. A system according to claim 3 wherein said coating comprises paraffin.

8. A system according to claim 3 wherein said recess occurs in said circulating means.

9. A system according to claim 3 wherein said agent includes an anti-corrosion agent.

10. A system according to claim 3 wherein said agent includes an organic detergent.

11. A system according to claim 3 wherein said agent includes a sodium silicate.

References Cited in the file of this patent

UNITED STATES PATENTS

| Number | Name | Date |
|---|---|---|
| 497,046 | Benjamin | May 9, 1893 |
| 620,231 | Dehn | Feb. 28, 1899 |
| 931,498 | Schlueter | Aug. 17, 1909 |
| 1,325,361 | Harshberger | Dec. 16, 1919 |
| 1,482,077 | Gearon | Jan. 29, 1924 |
| 1,994,551 | Weis | Mar. 19, 1935 |
| 1,997,849 | Bargar | Apr. 16, 1935 |
| 2,046,192 | Snell et al. | June 30, 1936 |
| 2,395,697 | Tidd | Feb. 26, 1946 |
| 2,470,851 | Hermanson | May 24, 1949 |
| 2,580,856 | Smith et al. | Jan. 1, 1952 |
| 2,744,880 | Brown | May 8, 1956 |